(12) United States Patent
Zhao

(10) Patent No.: US 8,488,095 B2
(45) Date of Patent: Jul. 16, 2013

(54) LIQUID CRYSTAL DISPLAY PANEL

(75) Inventor: Haiyu Zhao, Beijing (CN)

(73) Assignee: Bejing Boe Optoelectronics Technology Co., Ltd., Beijing (CN)

( * ) Notice: Subject to any disclaimer, the term of this patent is extended or adjusted under 35 U.S.C. 154(b) by 373 days.

(21) Appl. No.: 12/126,320

(22) Filed: May 23, 2008

(65) Prior Publication Data

US 2009/0066904 A1    Mar. 12, 2009

(30) Foreign Application Priority Data

Sep. 10, 2007 (CN) .......................... 2007 1 0121554

(51) Int. Cl.
*G02F 1/1339* (2006.01)

(52) U.S. Cl.
USPC .......................................................... 349/157

(58) Field of Classification Search
USPC ........................................ 349/155, 156–157
See application file for complete search history.

(56) References Cited

U.S. PATENT DOCUMENTS

| | | | | |
|---|---|---|---|---|
| 6,067,144 A * | 5/2000 | Murouchi | ...................... | 349/156 |
| 7,796,233 B2 * | 9/2010 | Park et al. | ...................... | 349/155 |
| 7,932,985 B2 * | 4/2011 | Oh | .................. | 349/157 |
| 2002/0171800 A1 * | 11/2002 | Miyazaki et al. | ............. | 349/156 |
| 2003/0090615 A1 * | 5/2003 | Park | .............................. | 349/153 |

* cited by examiner

*Primary Examiner* — Edward Glick
*Assistant Examiner* — Dennis Y Kim
(74) *Attorney, Agent, or Firm* — Ladas & Parry LLP

(57) ABSTRACT

The present invention discloses a liquid crystal display panel, including an array substrate; a color filter substrate; and primary post spacers and secondary post spacers disposed between the array substrate and the color filter substrate, wherein the color filter substrate is divided into a side portion and a central portion inside the side portion, and the density of the secondary post spacers in the central portion is less than that in the side portion.

16 Claims, 4 Drawing Sheets

PRIOR ART

LIQUID CRYSTAL DISPLAY PANEL

This application claims the benefit of Chinese Patent Application No. 200710121554.7, filed on Sep. 10, 2007, which is incorporated herein by reference in its entirety.

BACKGROUND OF THE INVENTION

The present invention relates to a liquid crystal display (LCD) device, and more particularly, to a LCD panel for a LCD device.

A LCD panel is formed by an array substrate and a color filter substrate that are assembled together with liquid crystal material filled between the two substrates. During manufacturing of LCD panels, a distance between the array substrate and the color filter substrate, i.e., a cell gap, is an important parameter.

In order to maintain the cell gap between the array substrate and the color filter substrate consistent, spacers having a certain height are disposed between the two substrates before assembling the two substrates. The spacers typically used mainly include two kinds of spacers: ball spacers (BSs) and post spacers (PSs). With respect to LCD panels using ball spacers, the ball spacers are a component used individually in the manufacturing process and are dispersed onto the array substrate or the color filter substrate by a dispenser, and thus the cell gap is maintained consistent with the dimensional stability of ball spacers during the assembling procedure. However, when using the dispensing method, ball spacers may be dispensed onto pixel areas and the orientation of liquid crystal material around the ball spacers may be adversely affected, causing light leakage and decreasing contrast. If post spacers are used during manufacturing LCD panels, post spacers are disposed at the black matrix (BM) on color filter substrate (C/F) so as to control the cell gap and improve contrast. Also, light leakage in pixel areas, which may be caused by using ball spacers, can be prevented by precisely controlling the position of post spacers in each pixel area.

Post spacers include primary post spacers and secondary post spacers, when post spacers are used for manufacturing LCD panels. The primary post spacers and secondary post spacers are used in cooperation by many manufactures, and the post spacers are uniformly distributed over the whole color filter substrate. The primary post spacers are higher than the secondary post spacers, and the area of the bottom surface of each primary post spacer approximately equals to that of each secondary post spacer. The primary post spacers contact with the upper portion of the array substrate to control the cell gap, while in normal condition the secondary post spacers do not contact with the array substrate. As shown in FIG. 6, the periphery portion of a LCD panel is bonded together by sealant 9. Normally, the cell gap at all portions are consistent, that is, for example the cell gap "a1" equals to the cell gap "b1" in a central portion and a side portion in a normal condition before impact, respectively. However, if the left side of the panel is subject to compression or impact, as shown in FIG. 7, on one hand, the array substrate 2 deforms causing displacement between the array substrate 2 and the color filter substrate 1, as shown in portion S of FIG. 7, and on the other hand, cell gap changes due to the fluidity of liquid crystal materials, at which time, the cell gap "b2" at the light leakage portion after impact is greater than the cell gap "b1" before impact, which equals to the cell gap "a1," and the cell gap "a1" at the compressed portion before impact is greater than the cell gap "a2" at the compressed portion after impact. Therefore, when the panel is subject to impact, the secondary post spacers 4 shift move onto a thin film transistor (TFT) device or a data line. Meanwhile, because of the high density of the secondary post spacers and the high friction force between secondary post spacers 4 and the TFT device or the data line, the color filter substrate cannot return to its original position quickly, causing light leakage. In the figure, the light leakage portion 6 is on the right side from the central portion of the color filter substrate, deteriorating the display quality.

SUMMARY OF THE INVENTION

In an embodiment of the invention, a liquid crystal display (LCD) panel with post spacers is provided, an array substrate; a color filter substrate; and primary post spacers and secondary post spacers disposed between the array substrate and the color filter substrate, wherein the color filter substrate is divided into a side portion and a central portion inside the side portion, and the density of the secondary post spacers in the central portion is less than that in the side portion.

The LCD panel according to the embodiment of the invention decreases the friction force between the secondary post spacers and a TFT device, a data line or a gate line by decreasing the density of the secondary post spacers in the central portion, so that the panel surface can return to its original position in a short time after compression or impact is released, so as to prevent occurrence of light leakage and improve display quality.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Exemplary embodiments of the present invention will be described hereafter with reference to the accompanying drawings. It will be understood that when a layer or element is referred to as being "on" or "connected to" another layer or substrate, it can be directly on or connected to the other layer or substrate, or intervening layers may also be present. The same reference number refers to the same part in the following description.

Figure 1:
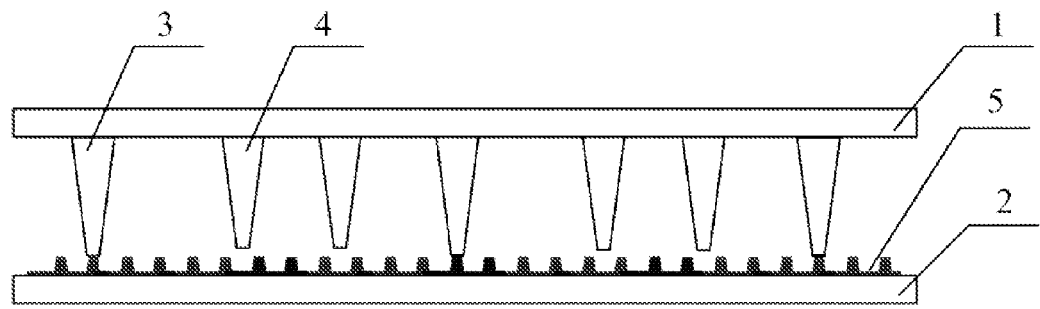
FIG. 1 is a view illustrating the position of the post spacers of the LCD panel in the central portion according to an embodiment of the invention.
Figure 2:
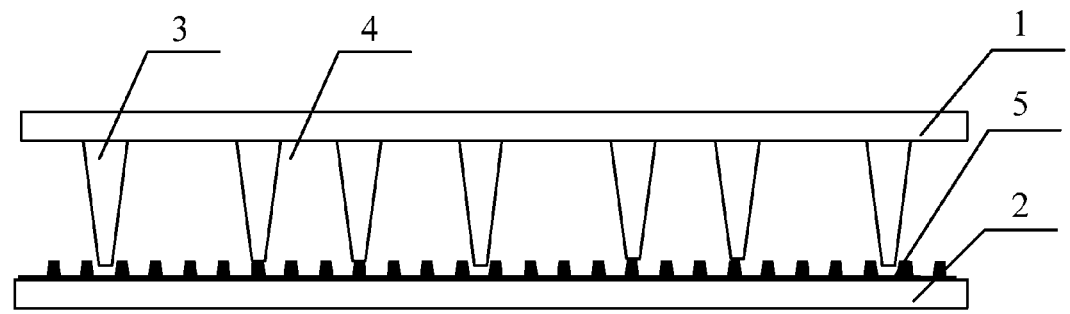
FIG. 2 is a view illustrating the position of the post spacers of the LCD panel in the central portion after compression at the left side according to an embodiment of the invention.

FIG. 1 is a view illustrating the positions of post spacers in a central portion of a liquid crystal display (LCD) panel according to an embodiment of the invention. As shown in FIG. 1, the LCD panel includes an array substrate 2, a color filter substrate 1, and primary post spacers 3 and secondary post spacers 4 disposed between the array substrate 2 and the color filter substrate 1. The color filter substrate 1 can be divided into a side portion 7 and a central portion 8 inside the side portion 7, as shown in the plan view of FIG. 3. The density of the secondary post spacers 4 in the central portion 8 is about ⅔ of that in the side portion 7. Before the panel is subject to compression or impact, primary post spacers 3 contact a thin film transistor (TFT) device 5, a data line or a gate line, but secondary post spacers 4 do not contact the array substrate 2. FIG. 2 is a view illustrating the positions of the post spacers in the central portion 8 of the LCD panel after impact is applied at the left side. The cell gap increases and the color filter substrate 1 shifts to the right side after impact, so that the secondary post spacers may shift onto a TFT device 5, a data line or a gate line. However, when the impact force is released, the color filter substrate 1 returns rapidly to its original position because the density of the secondary post spacers 4 decreases, and occurrence of light leakage can be avoided and display quality can be improved.

The density of the secondary post spacers 4 decreases within a certain range. If the density of the secondary post spacers 4 in the central portion where light leakage is liable to occur is too low, the cell gap may changes permanently when the panel is subject to a great compression or impact in the central portion.

Also, preferably, the length of a first pair of opposite sides of the central portion 8 may be about ⅔ of the length of the corresponding sides of the color filter substrate, and the length of a second pair of opposite sides may be about ½ of the length of the corresponding sides of the color filter substrate. The first pair of the opposite sides may be in a lengthwise direction, and correspondingly the second pair of the opposite sides may be in a widthwise direction. The central portion 8 can further be divided into a first central portion and a second central portion inside the first central portion. The density of the secondary post spacers in the second central portion is less than that in the first central portion, and the density in the second central portion may be about ¼-⅗ of the density in the first central portion, preferably about ½ of the density in the first central portion. The length of the first pair of opposite sides of the second central portion may be about ½-⅚ of the length of the corresponding sides of the first central portion, and the length of the second pair of opposite sides of the second central portion may be about ⅓-⅔ of the length of the corresponding sides of the first central portion, preferably about ⅔, and the length of the first pair of opposite sides of the second central portion is preferably the length of the corresponding sides of the first central portion, preferably about ½. Also, The first pair of the opposite sides may be in a lengthwise direction, and correspondingly the second pair of the opposite sides may be in a widthwise direction.

In the foregoing LCD panel, by decreasing the number of secondary post spacers in the central portion, the friction force between the secondary post spacers and a TFT device, a data line or a gate line decreases, so that the panel surface can return to its original position in a short time after compression or impact is released; therefore, the occurrence of light leakage can be avoided and the display quality can be improved.

In a conventional LCD panel, when the left side of a panel is subject to compression or impact, secondary post spacers 4 may shift onto a TFT device 5 or a data line; meanwhile, the friction force between the secondary post spacers 4 and the TFT device 5 or the data line is great due to the high density of secondary post spacers 4, so the color filter substrate 1 cannot return to its original position in a short time, and the area where light leakage occurs seriously is on the right side from the central position of the color filter substrate. Similarly, when the right side of a panel is subject to compression or impact, the area where light leakage occurs seriously is on the left side from the central position of the color filter substrate.

Also, in a conventional LCD panel, when the top side of panel is subject to compression or impact, secondary post spacers 4 may shift onto a TFT device 5 or a gate line; meanwhile, the friction force between the secondary post spacers 4 and the TFT device 5 or a gate line is great due to the high density of the secondary post spacers 4, so the color filter substrate 1 cannot return to its original position in a short time, and thus light leakage occurs. The area where light leakage occurs seriously is on the lower side from the central position of the color filter substrate 1. Similarly when the bottom side of panel is subject to compression or impact, the area where light leakage occurs seriously is on the upper side from the central position of the color filter substrate 1.

Figure 3:
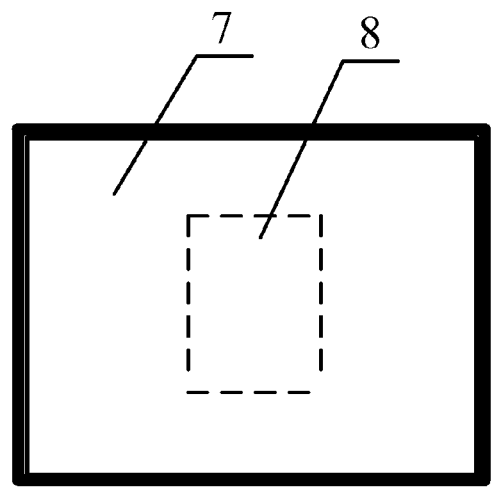
FIG. 3 is a view illustrating the position of a apparent light leakage portion of the color filter substrate according to an embodiment of the invention.

Accordingly, no matter the left side, right side, upper side, or the lower side is subject to compression or impact, the central portion 8 is the area where light leakage occurs seriously. As the length of the secondary pair of opposite sides of the central portion 8 is less than the length of the first pair of opposite sides, the ratio of the area where light leakage is prone to occurrence to the whole area along the direction of the secondary pair of opposite sides is greater than the ratio of the area where light leakage is prone to occurrence to the whole area along the direction of the first pair of opposite sides, as shown in FIG. 3. When the central portion 8 is subject to impact or compression, the displacement of the primary post spacers 3 and the variation of cell gap are small because the edge of panel is fixed, and substantial no light leakage occurs at the periphery.

Figure 4:
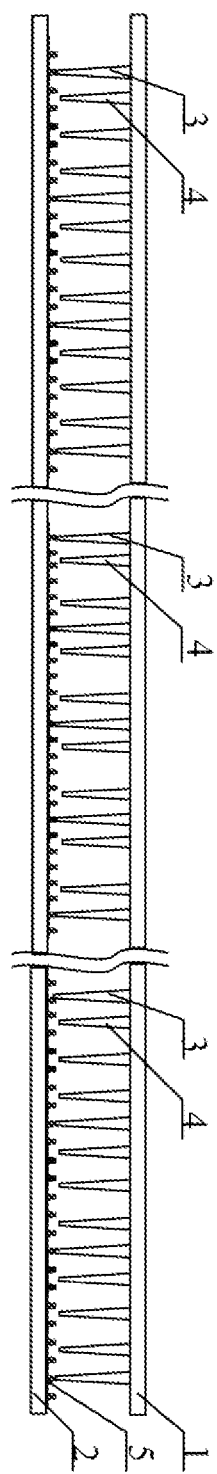
FIG. 4 is a view illustrating the densities of the post spacers of the LCD panel in different positions according to an embodiment of the invention.
Figure 5:
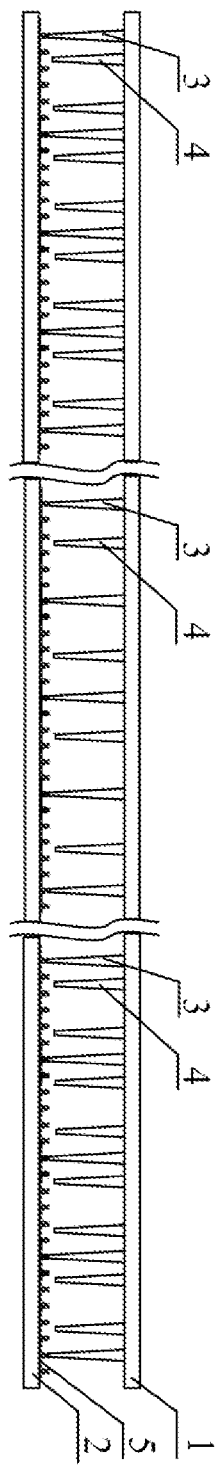
FIG. 5 is a view illustrating the density of the post spacers of the LCD panel in the central portion according to an embodiment of the invention.
Figure 6:
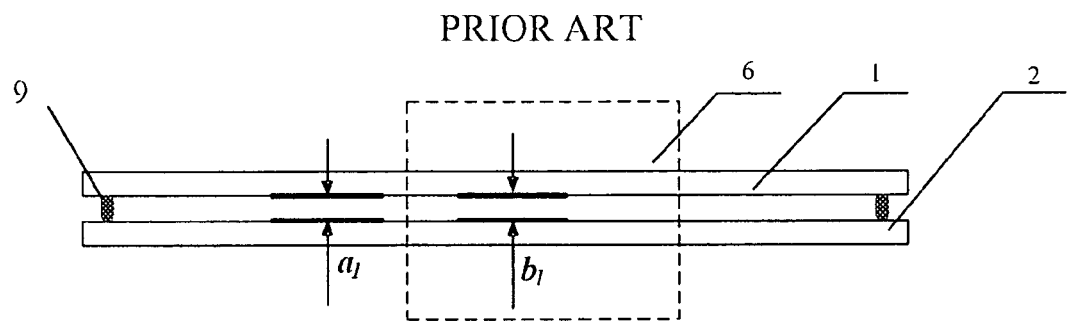
FIG. 6 is a view illustrating the panel cell gap of a conventional LCD panel under normal conditions.
Figure 7:
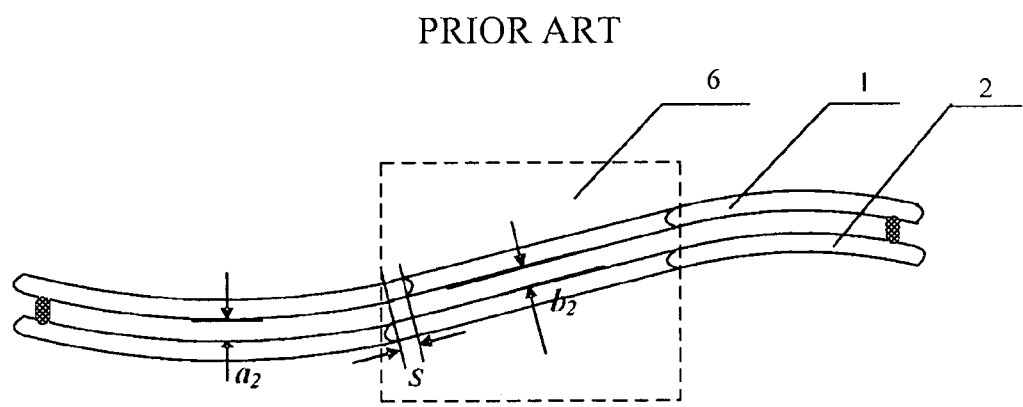
FIG. 7 is a view illustrating the panel cell gap of the conventional LCD panel after compression at the left side.

FIG. 4 is a view illustrating the density of the post spacers of the LCD panel in different positions of the panel. The central portion 8 is the area where light leakage occurs seriously. At the central portion 8, the length of the first pair of opposite sides is preferably about ⅔ of the length of the corresponding sides of the color filter substrate, and the length of the secondary pair of opposite sides is preferably about ½ of the length of the corresponding sides of the color filter substrate. The density of the secondary post spacers disposed in the central portion 8 is small, and the density of the secondary post spacers disposed in the side portion 7 is great and more than that of the central portion 8. As shown in FIG. 4, the density of the secondary post spacers in the central portion 8 is about ⅔ of the density of the secondary post spacers in the side portion 7. Meanwhile, the central portion 8 can be further divided into a first central portion and a second central portion. The density in the second central portion is about ½ of the density in the first central portion, the length of the first pair of opposite sides of the second central portion is about ⅔ of the length of the corresponding sides of the first central portion, and the length of the second pair of opposite sides of the second central portion is about ½ of the length of the corresponding sides of the first central portion. The density and position relationship of the secondary post spacers in the central portion is shown in FIG. 5, for example.

Depending on whether light leakage occurs obviously in case of impact, the foregoing LCD panel can be divided into two areas, that is, an area where light leakage is prone to occurrence and an area where light leakage is not prone to occurrence relatively. By decreasing the density of the secondary post spacers in the area where light leakage is prone to occurrence, i.e., the central portion, the friction force between the secondary post spacers and a TFT device, a data line, or a gate line decreases, so that the color filter substrate is able to return to its original position in a short time after compression or impact is released, and therefore, the occurrence of light leakage can be avoided, and the display quality can be improved.

The embodiments of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A liquid crystal display (LCD) panel, comprising:
   an array substrate;
   a color filter substrate including a pixel area; and
   primary post spacers and secondary post spacers disposed between the array substrate and the color filter substrate,
   wherein the primary post spacers are higher than the secondary post spacers and contact the array substrate, and the secondary post spacers do not contact the array substrate or any component of the array substrate, and
   wherein the color filter substrate is divided into a side portion at least partially within the pixel area and a central portion inside the side portion, the side portion and the central portion are arranged side by side, the division being at a location line where the density of the secondary post spacers changes from one side of the location line to the other, and the density of the secondary post spacers in the central portion is less than that in the side portion.

2. The LCD panel of claim 1, wherein the density of the secondary post spacers in the central portion is about ½ of that in the side portion.

3. The LCD panel of claim 2, wherein the density of the secondary post spacers in the central portion is about ⅔ of that in the side portion.

4. The LCD panel of claim 1, wherein the central portion is further divided into a first central portion and a second central portion inside the first central portion, and the density of the secondary post spacers in the second central portion is less than that in the first central portion.

5. The LCD panel of claim 4, wherein the density of the secondary post spacers in the second central portion is about ¼-⅗ of that in the first central portion.

6. The LCD panel of claim 5, wherein the density of the secondary post spacers in the second central portion is about ½ of that in the first central portion.

7. The LCD panel of claim 4, wherein the length of a first pair of opposite sides of the second central portion in a lengthwise direction is about ½ of that of the corresponding sides of the first central portion, and the length of a second pair of opposite sides of the second central portion in a widthwise direction is about ⅓-⅔ of that of the corresponding sides of the first central portion.

8. The LCD panel of claim 7, wherein the length of the first pair of opposite sides of the second central portion is about ⅔ of that of the corresponding sides of the first central portion, and the length of the second pair of opposite sides of the second central portion is about ½ of that of the corresponding sides of the first central portion.

9. The LCD panel of claim 1, wherein the length of a first pair of opposite sides of the central portion in a lengthwise direction is about ½ of that of the corresponding sides of the color filter substrate, and the length of a second pair of opposite sides in a widthwise direction is about ⅓-⅔ of that of the corresponding sides of the color filter substrate.

10. The LCD panel of claim 9, wherein the length of the first pair of opposite sides of the central portion is about ⅔ of that of the corresponding sides of the color filter substrate, and the length of the second pair of opposite sides of the central portion is about ½ of that of the corresponding sides of the color filter substrate.

11. A liquid crystal display (LCD) panel, comprising:
    an array substrate;
    a color filter substrate; and
    primary post spacers and secondary post spacers disposed between the array substrate and the color filter substrate,
    wherein the secondary post spacers do not contact the array substrate or any component of the array substrate,
    wherein the primary post spacers are higher than the secondary post spacers and contact the array substrate, and the color filter substrate is divided into a side portion and a central portion inside the side portion, the side portion and the central portion are arranged side by side, the division being at a location line where the density of the secondary post spacers changes from one side of the location line to the other, and the density of the secondary post spacers in the central portion is less than that in the side portion, wherein the length of a first pair of opposite sides of the central portion in a lengthwise direction is about ½ of that of the corresponding sides of the color filter substrate, and the length of a second pair of opposite sides in a widthwise direction is about ⅓-⅔ of that of the corresponding sides of the color filter substrate.

12. The LCD panel of claim 11, wherein the length of the first pair of opposite sides of the central portion is about ⅔ of that of the corresponding sides of the color filter substrate, and the length of the second pair of opposite sides of the central portion is about ½ of that of the corresponding sides of the color filter substrate.

13. A liquid crystal display (LCD) panel, comprising:
    an array substrate;
    a color filter substrate including a pixel area; and
    primary post spacers and secondary post spacers disposed between the array substrate and the color filter substrate,
    wherein the primary post spacers are higher than the secondary post spacers and contact the array substrate, and the secondary post spacers do not contact the array substrate or any component of the array substrate, and
    wherein the color filter substrate is divided into a first portion and a second portion at least within the pixel area, the first portion and the second portion are arranged side by side, light leakage is more prone to occur in the first portion than the second portion, and the density of the secondary post spacers in the first portion is less than that in the second portion; and
    the division being at a location line where the density of the secondary post spacers changes from one side of the location line to the other.

14. The LCD panel of claim 13, wherein the density of the secondary post spacers in the first portion is about ½ of that in the second portion.

15. The LCD panel of claim 13, wherein the density of the secondary post spacers in the first portion is about ⅔ of that in the second portion.

16. The LCD panel of claim 13, wherein the first portion is surrounded by the second portion.

* * * * *

UNITED STATES PATENT AND TRADEMARK OFFICE
CERTIFICATE OF CORRECTION

PATENT NO. : 8,488,095 B2
APPLICATION NO. : 12/126320
DATED : July 16, 2013
INVENTOR(S) : Haiyu Zhao It is certified that error appears in the above-identified patent and that said Letters Patent is hereby corrected as shown below:

On the title page item (73), the spelling of the Assignee name is incorrectly listed as Bejing Boe Optoelectronics Technology Co., Ltd.

The correct spelling should be

Beijing Boe Optoelectronics Technology Co., Ltd.

Signed and Sealed this
Twenty-ninth Day of October, 2013

Teresa Stanek Rea
*Deputy Director of the United States Patent and Trademark Office*